United States Patent
Smith, III

(10) Patent No.: US 10,882,248 B2
(45) Date of Patent: Jan. 5, 2021

(54) THREE DIMENSIONAL PRINTER FOR FUSING POWDERS WITH SURFACE COLORATION USING A VCSEL ARRAY

(71) Applicant: 3D Systems, Inc., Rock Hill, SC (US)

(72) Inventor: James Francis Smith, III, Tega Cay, SC (US)

(73) Assignee: 3D Systems, Inc., Rock Hill, SC (US)

( * ) Notice: Subject to any disclaimer, the term of this patent is extended or adjusted under 35 U.S.C. 154(b) by 259 days.

(21) Appl. No.: 16/020,057

(22) Filed: Jun. 27, 2018

(65) Prior Publication Data
US 2019/0001557 A1 Jan. 3, 2019

Related U.S. Application Data

(60) Provisional application No. 62/526,125, filed on Jun. 28, 2017.

(51) Int. Cl.
 *B29C 64/165* (2017.01)
 *B29C 64/153* (2017.01)
 (Continued)

(52) U.S. Cl.
 CPC .......... *B29C 64/165* (2017.08); *B29C 64/153* (2017.08); *B29C 64/194* (2017.08);
 (Continued)

(58) Field of Classification Search
 CPC ... B29C 64/165; B29C 64/194; B29C 64/153; B29C 64/209; B29C 64/393;
 (Continued)

(56) References Cited

U.S. PATENT DOCUMENTS

2016/0082662 A1 3/2016 Majer
2016/0198576 A1* 7/2016 Lewis ................... B29C 64/118
 361/761
(Continued)

FOREIGN PATENT DOCUMENTS

| CN | 106346778 | 1/2017 |
| WO | 2016/186609 | 11/2016 |
| WO | 2017/019102 | 2/2017 |

OTHER PUBLICATIONS

PCT International Search Report the International Searching Authority for PCT/US2018/039726, dated Oct. 26, 2018 (7 pages).
(Continued)

*Primary Examiner* — Nahida Sultana

(57) ABSTRACT

A three dimensional printing system for producing a three dimensional article of manufacture includes a build platform, a powder dispensing apparatus, a light emitting device head, a drop ejecting head, a movement mechanism, and a controller. The light emitting device head may be a vertical cavity surface-emitting laser (VCSEL) head that has a columnar arrangement of VCSELs that emit light having a defined spectral distribution. The drop ejecting head is configured to separately eject a plurality of different inks having correspondingly different absorption coefficients for the defined spectral distribution. The controller operates the powder dispensing apparatus to dispense powder, move and operate the drop ejecting head to define an array of inked pixels, and move and operate the VCSEL head to fuse the inked pixels. The controller varies an energy output of the VCSELs in correspondence with a variation of an absorption coefficient of the inked pixels.

19 Claims, 4 Drawing Sheets

(51) Int. Cl.
  *B29C 64/209*   (2017.01)
  *B33Y 10/00*    (2015.01)
  *B33Y 80/00*    (2015.01)
  *B29C 64/194*   (2017.01)
  *B33Y 30/00*    (2015.01)
  *B33Y 70/00*    (2020.01)
  *B29C 64/393*   (2017.01)
  *B33Y 50/02*    (2015.01)

(52) U.S. Cl.
  CPC .......... *B29C 64/209* (2017.08); *B29C 64/393* (2017.08); *B33Y 10/00* (2014.12); *B33Y 30/00* (2014.12); *B33Y 70/00* (2014.12); *B33Y 80/00* (2014.12); *B29K 2995/0021* (2013.01); *B33Y 50/02* (2014.12)

(58) Field of Classification Search
  CPC ......... B33Y 80/00; B33Y 10/00; B33Y 30/00; B33Y 70/00; B33Y 50/02; B29K 2995/0021
  See application file for complete search history.

(56) References Cited

U.S. PATENT DOCUMENTS

| | | |
|---|---|---|
| 2017/0239932 A1   | 8/2017 | Knecht et al. |
| 2018/0154576 A1*  | 6/2018 | Chen ................... B29C 64/268 |
| 2019/0152143 A1*  | 5/2019 | Fieldman ............. B29C 64/153 |
| 2019/0270136 A1*  | 9/2019 | Gibson ................. B33Y 30/00 |

OTHER PUBLICATIONS

PCT Written Opinion of the International Searching Authority for PCT/US2018/039726, dated Oct. 26, 2018 (5 pages).

\* cited by examiner

THREE DIMENSIONAL PRINTER FOR FUSING POWDERS WITH SURFACE COLORATION USING A VCSEL ARRAY

CROSS REFERENCE TO RELATED APPLICATIONS

This non-provisional patent application claims priority to U.S. Provisional Application Ser. No. 62/526,125, Entitled "THREE DIMENSIONAL PRINTER FOR FUSING POWDERS WITH SURFACE COLORATION USING A VCSEL ARRAY" by James F. Smith III, filed on Jun. 28, 2017, incorporated herein by reference under the benefit of U.S.C. 119(e).

FIELD OF THE INVENTION

The present disclosure concerns an apparatus and method for fabrication of solid three dimensional (3D) articles of manufacture from the selective fusion of polymeric powders. More particularly, the present invention utilizes a variable color absorber and compensates for a variation in an absorption coefficient in the absorber.

BACKGROUND

Three dimensional (3D) printing systems are in rapidly increasing use for purposes such as prototyping and manufacturing. One type of 3D printer is often referred to as "selective laser sintering" in which layers of thermoplastic powder are dispensed and selectively fused together with a laser to form a three dimensional (3D) article of manufacture. Historically these systems have been monochrome. There is a desire to develop newer powder fusion systems that can provide multicolored articles.

SUMMARY

Figure 1:
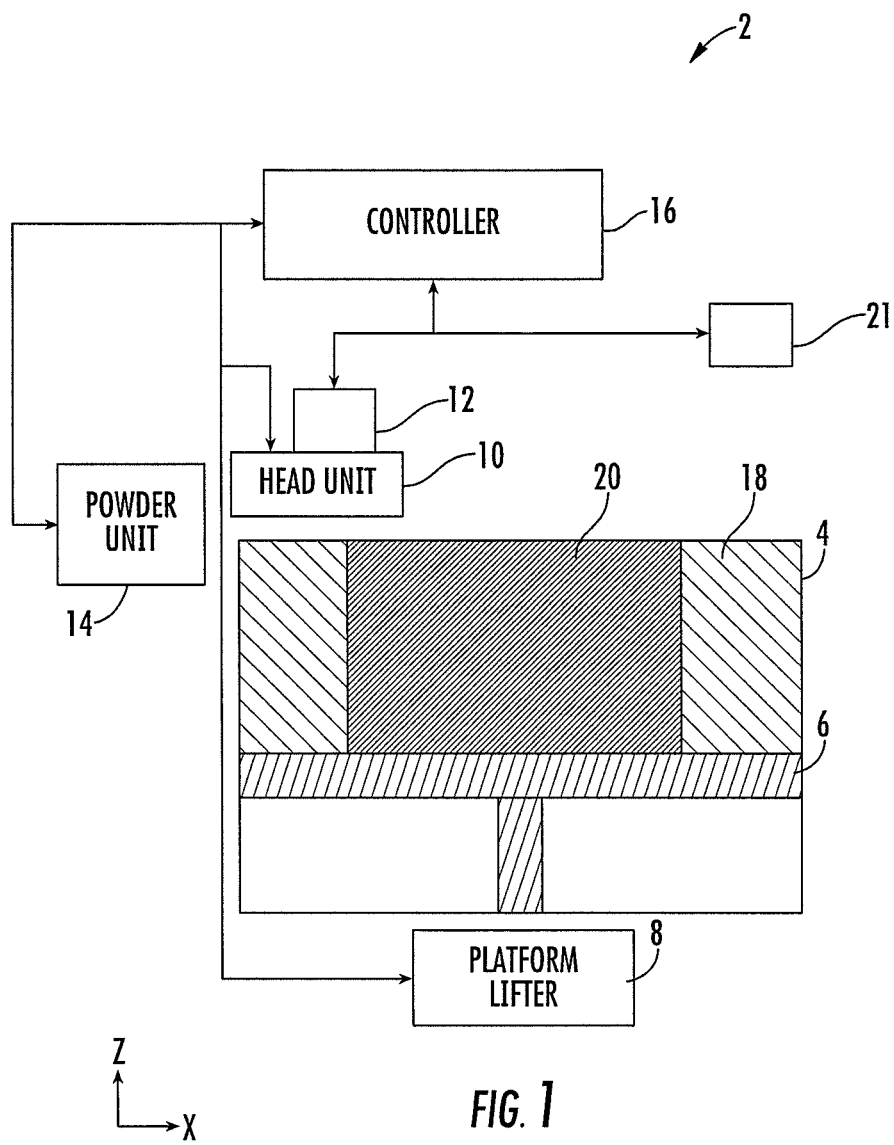
FIG. 1 is a schematic block diagram of a three dimensional printing system.

In a first aspect of the disclosure, a three dimensional printing system for producing a three dimensional article of manufacture includes a build platform, a powder dispensing apparatus, a light emitting device head, a drop ejecting head, a movement mechanism, and a controller. The light emitting device head has a columnar arrangement of light emitting devices that emit light having a defined spectral distribution. The drop ejecting head is configured to separately eject a plurality of different inks having correspondingly different absorption coefficients for the defined spectral distribution. The controller is configured to perform the following steps: (1) Operate the powder dispensing apparatus to dispense a layer of fusible powder above the build platform. (2) Operate the movement mechanism to scan the drop ejecting head over the dispensed layer of powder. (3) Concurrent with scanning the drop ejecting head over the powder operate the drop ejecting head to define an array of inked pixels that have received varying amounts of the different inks whereby a resultant absorption coefficient of the inked pixels for the defined spectral distribution varies across the array of inked pixels. (4) Operate the movement mechanism to scan the light emitting device head over the inked pixels. (5) Concurrent with scanning the light emitting device head over the inked pixels operate the light emitting devices to apply optical energy to the inked pixels whereby an optical energy per unit area is varied to compensate for the varying absorption coefficient of the inked pixels.

In one implementation the array of inked pixels includes an outer boundary of colored pixels having a varying color that correlates with the varying absorption coefficient. In another implementation the colored pixels are defined by varying amounts of primary colors to provide the varying color, the primary colors have different absorption coefficients for the defined spectral distribution. In yet another implementation the colored pixels are visible when the three dimensional article of manufacturing is completed and the varying color is based upon a selected color variation, the inked pixels include inner pixels that are generally not visible when the three dimensional article of manufacturing is completed, a selection of the primary colors to be used for the inner pixels is based upon a different criteria than that of the colored pixels. In still another implementation the different criteria includes maximizing an absorption coefficient for the inner pixels.

In a further implementation a single integrated head includes the light emitting device head and the drop ejecting head whereby the light emitting device head and the drop ejecting head always scan together. In a yet further implementation the light emitting device head and the drop ejecting head can be separately moveable modules. In an exemplary implementation the light emitting devices are vertical cavity surface-emitting laser (VCSEL) devices.

In another implementation the three dimensional printing system includes a thermal sensor coupled to the controller. The thermal sensor can be a single sensor, an array of sensors, or an infrared camera. The controller utilizes the thermal sensor to determine a temperature of the powder. The controller further performs a preheating operation whereby the light emitting device head is used to preheat the powder before fusing a layer of powder. The preheat temperature of the top layer of powder is just below a melting point.

In yet another implementation the powder absorbs significant energy at the defined spectral distribution. The light emitting device array can therefore fuse portions of the powder that have not received ink.

In a further implementation the controller stores a lookup table in memory that relates a pixel color to an absorption coefficient and/or to an optical energy value. The controller uses the lookup table to convert a color of an inked pixel to the optical energy value. The optical energy value determines the amount of energy applied by the light emitting device head to the pixel. The pixel color is based upon a plurality of primary colors applied to the pixel.

In a yet further implementation the controller stores a formulaic relationship between a pixel color and a computed absorption coefficient. The pixel color is based upon a mathematical combination of primary colors. The amount of each primary color is used to compute a resultant absorption coefficient for the pixel. The absorption coefficient is in turn used to compute the amount of energy to be applied by the light emitting device head to the pixel. The computation can also factor in a sensed temperature of the pixel.

In another implementation the inked pixels contain a defined outer boundary of the three dimensional article of manufacture. The controller operates the light emitting devices to solidify portions of inked pixels which defines the outer boundary within inked pixels to enhance the resolution of the outer boundary. The controller can operate the light emitting devices at a lower power level to dry the ink before the solidification.

DETAILED DESCRIPTION OF THE PREFERRED EMBODIMENTS

FIG. 1 is a block diagram representation of an exemplary 3D printing system 2. In describing the printing system 2, mutually orthogonal axes X, Y, and Z are utilized. The axes X and Y will be referred to as "lateral" or "horizontal" axes and Z will be described as a "vertical" axis. However, it is to be understood that Z is not necessarily perfectly aligned with a gravitational reference. Also X will refer to a "scan" axis and Y will refer to a "transverse" axis. The direction +Z is referred to as a generally "upward" direction and –Z is a generally "downward" direction.

Printing system 2 includes a build chamber 4, a build platform 6, a build platform lifter 8, a head unit 10, a head transport mechanism 12, and powder transport mechanism 14. A controller 16 is coupled to the platform lifter 8, head unit 10, powder unit 14, and other devices not shown.

The build chamber 4 contains unfused powder 18 and a 3D article of manufacture 20 formed from fused powder. In an illustrative embodiment, the unfused powder 18 includes thermoplastic polymer particles such as polyamide particles that can be fused together at a sufficient temperature. The 3D article of manufacture 20 is supported on the build platform 6. Platform lifter 8 is configured to vertically position the build platform 6 for proper dispensing of powder layers.

The powder unit 14 is configured to provide powder to the head unit 10 or to dispense a new layer of powder onto the build chamber 4. The head unit 10 is configured to selectively eject droplets of ink onto the new powder layer and to apply light radiation to selectively fuse portions of the new powder layer. The transport mechanism 12 imparts lateral motion to the head unit 10 so that the application of ink and light can properly address the new layer of powder to thereby add a colored and fused layer of material to the three dimensional article of manufacture 20.

In other embodiments the head unit 10 is fixed and a transport unit 12 imparts lateral motion of the build chamber 4. In yet other embodiments transport units 12 impart motion of both the head unit and the build chamber 4. Thus, the transport unit 12 imparts relative lateral motion between the head unit 10 and the build chamber 4 which can be imparted in various ways.

Controller 16 includes a processor (not shown) coupled to an information storage device (not shown). The information storage device stores software instructions, that when executed by the processor, operate the platform lifter 8, head unit 10, transport mechanism 12, powder unit 14, and other portions of the printing system 2. The controller can be on a single chip or board or it can be distributed among a number of separate boards or other substrates throughout the printing system 2.

In one embodiment the printing system 2 can include an infrared sensor, sensor array or camera 21. Sensor 21 can be utilized by controller 16 to monitor the temperature of the unfused powder 18.

Figure 2:
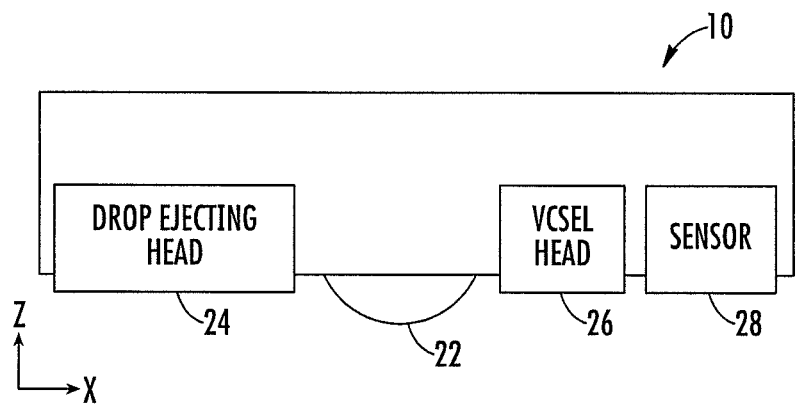
FIG. 2 is a schematic block diagram of an integrated head unit that is utilized in an exemplary three dimensional printing system.

FIG. 2 is a schematic side view representation of an exemplary head unit 10. In the illustrated embodiment the head unit 10 includes a roller 22, drop ejecting head 24, a VCSEL head 26, and a sensor 28. The roller 22 is for spreading and leveling a new layer of powder deposited onto the build chamber 4. The drop ejecting head 24 is for ejecting a pattern of ink drops of varying color onto the new layer of powder. The VCSEL head 26 is a laser array head 26. VCSEL refers to a "vertical cavity surface-emitting laser" type of light emitter. In the illustrated embodiment, each VCSEL emits infrared light having a defined spectral distribution. The spectral distribution can be within a range of 850 nanometers (nm) to 1100 nanometers (nm). The sensor 28 can include one or more sensors that emit and detect infrared and/or visible light. The sensor 28 can be used to detect the proper operation and/or alignment of the roller 22, drop ejecting head 24, and/or the VCSEL head 26. The drop ejecting head 24 ejects ink having an absorption coefficient within the defined spectral range of the VCSEL head 26.

In an alternative embodiment the head 26 can include other energy emitters as an alternative to VCSEL devices. Generally, head 26 includes a columnar arrangement of "light emitting devices" that can be diodes, diode lasers, or VCSEL devices. The light can transmitted through free space or through optical components such as fiber optics.

In additional embodiments other spectral distributions could be utilized that are selected from a broad range such as 200 nanometers (nm) to 20,000 nanometers (nm). In a more specific embodiment the spectral distribution may be within a range of 3000 nanometers to 6500 nanometers.

FIG. 2 depicts the exemplary head unit 10 as one composite head unit 10 that supports the roller 22, drop ejecting head 24, VCSEL head 26, and sensor(s) 28. In alternate embodiments the head unit 10 can be divided up into two or more independently moveable heads. It may be desirable to have a roller 22 and powder dispenser 14 as a separate unit for other configurations of printing system 2. It may also be desirable to have separate heads for the drop ejecting head 24 and the VCSEL head 26 for yet other configurations of printing system 2.

Figure 3:
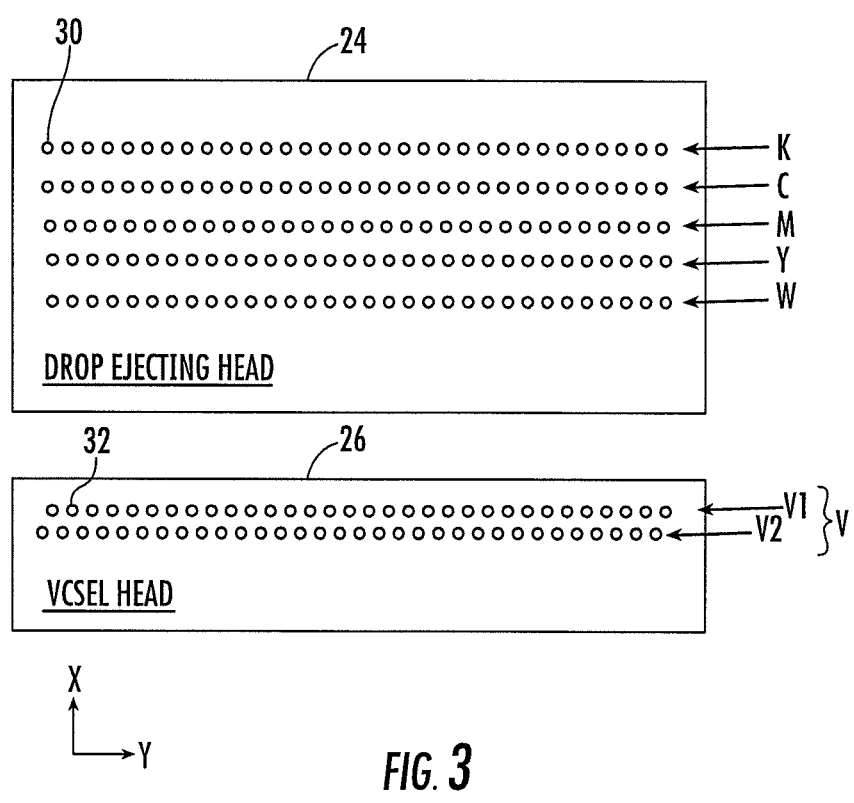
FIG. 3 is a plan view depicting a drop ejecting head and a vertical cavity surface-emitting laser (VCSEL) head.

FIG. 3 is a plan view depicting simplified layouts of the drop ejecting head 24 and the VCSEL head 26. Each of the heads 24, 26 includes a columnar group of devices that is arrayed along the transverse axis Y. The heads 24, 26 are configured to scan along the scan axis X relative to a dispensed layer of powder. The heads 24 and 26 are simplified for a purpose of illustration.

The drop ejecting head 24 includes a plurality of columnar groups (K, C, M, Y, W) of drop ejecting nozzles 30. The K group is a columnar group of nozzles that eject black ink. The black ink may include a carbon black pigment as a colorant. The C group ejects cyan ink; the M group ejects magenta ink; the Y group ejects yellow ink; the W group ejects white ink. Each columnar group of nozzles ejects a primary color for a system with five primary colors.

Other inks are possible. For example, a drop ejector may eject a visibly clear yet infrared absorbing ink that absorbs the spectral output of the VCSEL devices. As another example, the primary colors may include light cyan (LC) and light magenta (LM) so as to broaden a color space provided by the primary colors. As yet another examples, other primary colors such as orange or green can be used to further enhance an addressable color space. As yet a further example, other spot colors can be used that are very specific to a given application. For example, certain very specific spot colors are used to identify brands of goods and services.

While only a linear array for each columnar group of nozzles 30 is shown, other geometries are possible. Some columnar groups may be staggered to enhance resolution along the transverse axis Y. Below each nozzle 30 is a drop ejector mechanism which can include one or more of a thermal inkjet ejection, piezo inkjet ejection, or another mechanism. The thermal inkjet ejection mechanism operates by utilizing a small thin film resistor to generate ejection based upon a rapidly expanding vapor bubble. The piezo inkjet ejection mechanism operates by utilizing flexure or expansion of a piezoelectric drive mechanism.

The VCSEL head 26 is depicted has having a staggered columnar group V of individual VCSEL devices 32. Thus, columnar group V includes linear arrays V1 and V2 of VCSEL devices 32 that are staggered with respect to each other to increase resolution along the transverse Y-axis.

Figure 4:
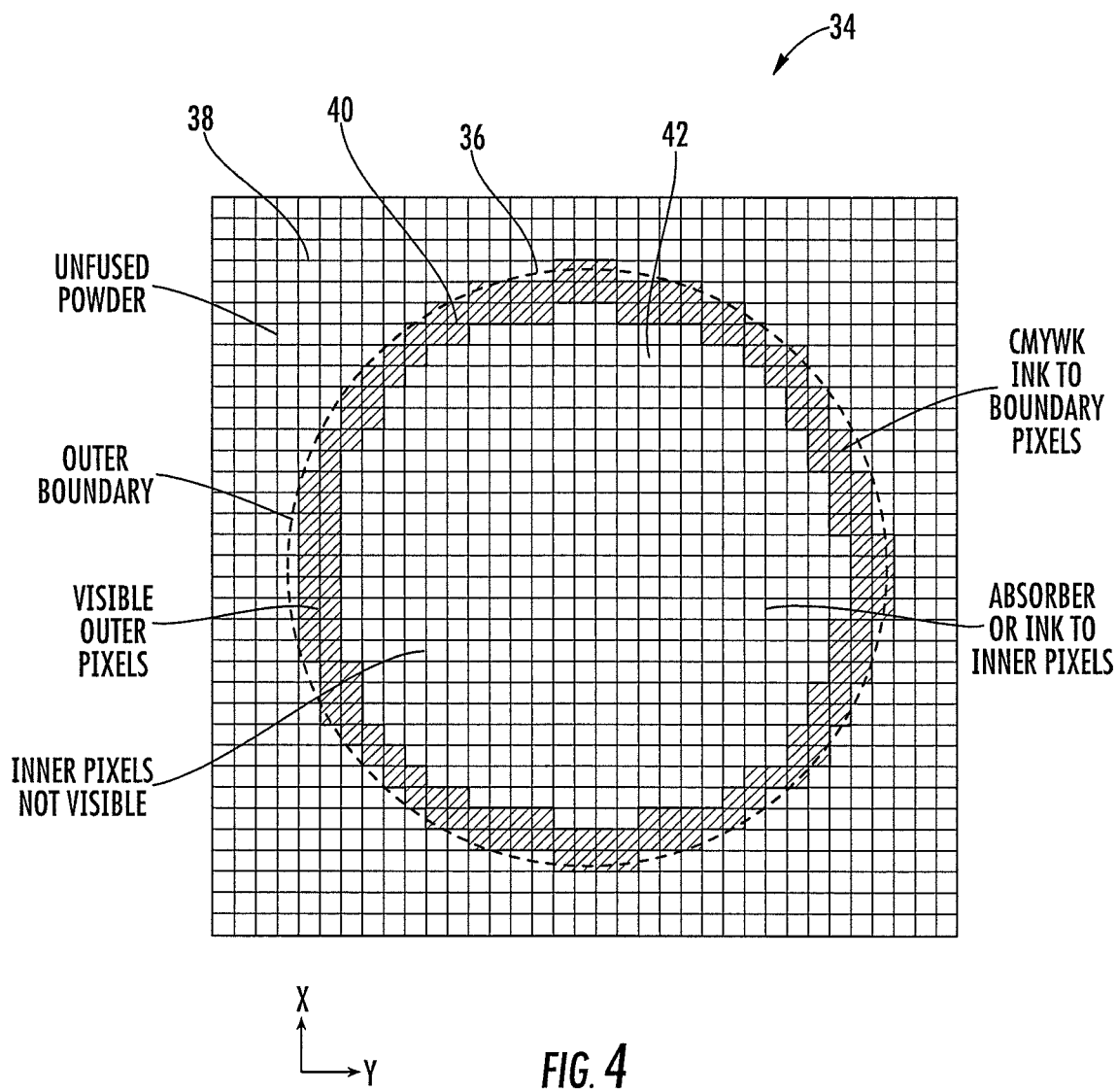
FIG. 4 is a simplified plan view depicting a layer of powder upon which ink has been printed.

FIG. 4 is a simplified plan view depicting a layer of powder 34 that has been dispensed, selectively printed upon with the drop ejecting head 24, and selectively solidified by the VCSEL head 26. Each small square in this figure represents a "pixel." For this layer a solidified circle is being formed having an outer boundary 36. The outer pixels 38 are unfused powder 38. After the article of manufacture 20 is completed, the unfused powder 38 will be removed thereby exposing the outer boundary 36. The shaded pixels 40 are colored pixels 40 by virtue of receiving variable amounts of primary colors from the drop ejecting head 24 before being fused by the VCSEL head 26. These colored pixels 40 will be visible after the 3D object of manufacturing is completed. The inner pixels 42 are fused by the VCSEL head 26 after receiving infrared-absorbing ink from the drop ejecting head 24.

Figure 5:
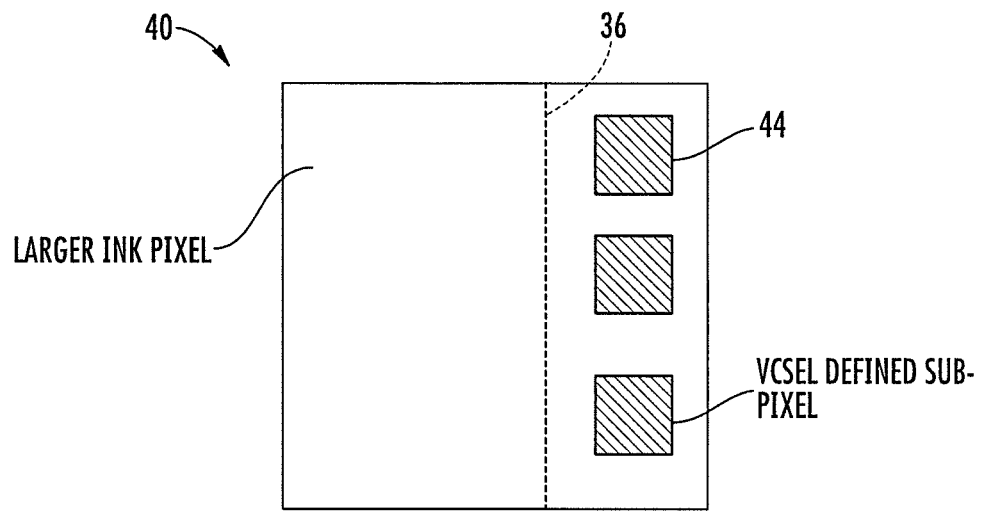
FIG. 5 depicts a single colored pixel.

FIG. 5 depicts a single one of the colored pixels 40 that are adjacent to the outer boundary 36. According to the illustrated embodiment, the VCSEL device 32 are utilized to enhance resolution of the outer boundary relative to the resolution of a larger pixel 40 defined by ink deposition. The VCSEL device 32 are utilized to solidify sub-pixels 44 of the larger pixel 40 to define the boundary 36 within the larger color pixel 40.

In some alternative embodiments the ink drop resolution may be the same or higher than that of the VCSEL resolution. Then the outer boundary 36 can be determined in part by the colored ink pixels 40.

Figure 6:
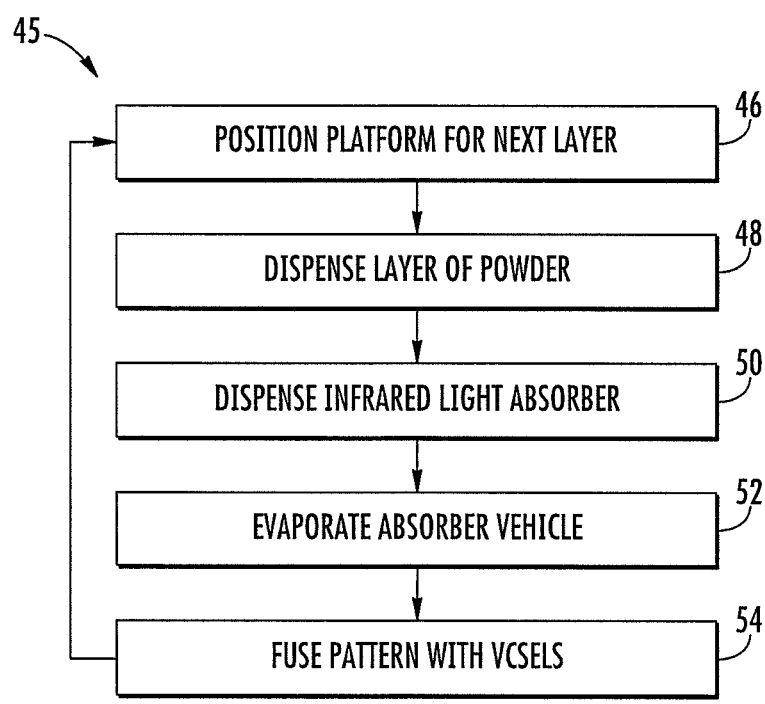
FIG. 6 depicts an exemplary printing method for forming a colored three dimensional article of manufacture.

FIG. 6 is a flowchart depicting a printing operation 45 of the printing system 2 as performed by controller 16 operating on portions of printing system 2. According to step 46 the platform lifter 8 vertically positions the build platform 6 for a new layer of powder 34. According to step 48, powder unit 14 and/or head unit 10 are operated to dispense a new layer of powder 34.

According to step 50, the drop ejecting head 24 ejects a dot matrix pattern of ink drops upon the new layer of powder 34 to define colored pixels 40 and inner pixels 42. The colored pixels 40 each receive liquid colorant from one or more of the columnar groups of nozzles 24. The colored pixels 40 have a color that varies along an outer boundary 36 that will be a visible part of the 3D article of manufacture 20 that is a result of the printing operation 45. Also as part of step 50, the inner pixels 42 are printed with an infrared absorbing ink which can be carbon black or a combination of the primary colors ejected by drop ejecting head 24. The inner pixels 42 may alternatively be defined by a visibly clear ink having an infrared absorber having a high absorption coefficient for the defined spectral distribution of the VCSEL head 26.

According to step 52, the printed inks are allowed to dry. In one embodiment, the VSEL head 26 is passed over the inked pixels (40 and 42) and operated at a lower power $P_L$ in order to accelerate evaporation of volatile ink vehicles. Additionally the lower power level can be used to pre-heat the powder either as part of step 52 or prior to step 50. In one embodiment the powder is preheated to a temperature just below the melting point. An infrared sensor can be utilized to provide closed loop temperature control feedback.

According to step 54, the VCSEL head 26 is passed over the inked pixels (40 and 42) to fully fuse the pixels. According to this embodiment, the inked pixels (40 and 42) have a variation in primary color which in turn results in a variation across the inked pixels (40 and 42) in an absorption coefficient for the VCSEL emissions. A total energy received by each inked pixel (40 and 42) is therefore adjusted to compensate for the variation in the absorption coefficient.

In one embodiment the colored pixels 40 have received varying amounts of the primary colors K, C, M, Y, and W and have a varying absorption coefficients. The optical energy applied by the VCSELs to the colored pixels 40 is therefore adjusted to provide an approximate equal absorption of energy before taking other factors into account.

After step 54, the process returns to step 46. Steps 46-54 are repeated until the 3D article of manufacture 20 is fully formed.

The specific embodiments and applications thereof described above are for illustrative purposes only and do not preclude modifications and variations encompassed by the scope of the following claims.

What is claimed:

1. A three dimensional printing system for producing a three dimensional article of manufacturing comprising:
    a build platform;
    a powder dispensing apparatus;
    a light emitting device head having a columnar arrangement of light emitting devices that emit light having a defined spectral distribution;
    a drop ejecting head configured to separately eject a plurality of different inks having correspondingly different absorption coefficients for the defined spectral distribution;
    a movement mechanism; and
    a controller configured to:
        operate the powder dispensing apparatus to dispense a layer of fusible powder above the build platform;
        operate the movement mechanism to scan the drop ejecting head over the dispensed layer of powder;
        concurrent with scanning the drop ejecting head over the powder operate the drop ejecting head to define an array of inked pixels that have received varying amounts of the plurality of different inks whereby a resultant absorption coefficient of the inked pixels for the defined spectral distribution varies across the array of inked pixels;
        operate the movement mechanism to scan the light emitting device head over the array inked pixels;
        concurrent with scanning the light emitting device head over the array inked pixels operate the light emitting devices to apply optical energy to the inked pixels whereby an optical energy per unit area is varied to compensate for the varying absorption coefficient of the array inked pixels.

2. The three dimensional printing system of claim 1, wherein the array of inked pixels includes an outer boundary of colored pixels having a varying color that correlates with the varying absorption coefficient.

3. The three dimensional printing system of claim 2, wherein the colored pixels are defined by varying amounts of primary colors to provide the varying color, the primary colors have different absorption coefficients for the defined spectral distribution.

4. The three dimensional printing system of claim 3, wherein the colored pixels are visible when the three dimensional article of manufacturing is completed and the varying color is based upon a selected color variation, the array inked pixels include inner pixels that are generally not visible when the three dimensional article of manufacturing is completed, a selection of the primary colors to be used for the inner pixels is based upon a different criteria than that of the colored pixels.

5. The three dimensional printing system of claim 4, wherein the different criteria includes maximizing an absorption coefficient for the inner pixels.

6. The three dimensional printing system of claim 1, wherein a single integrated head includes the light emitting device head and the drop ejecting head.

7. The three dimensional printing system of claim 1, wherein the light emitting devices are vertical cavity surface-emitting laser (VCSEL) devices.

8. The three dimensional printing system of claim 1, wherein the array inked pixels contain a defined outer boundary of the three dimensional article of manufacture.

9. The three dimensional printing system of claim 8, wherein the controller operates the light emitting devices to solidify portions of array inked pixels to define portions of the outer boundary within array inked pixels to enhance the resolution of the outer boundary.

10. The three dimensional printing system of claim 9, wherein, prior to solidifying portions of inked pixels, the controller operates the light emitting devices at a lower power level to dry the ink within array inked pixels.

11. A method of forming a three dimensional article of manufacturing comprising:
dispense a layer of powder above a build platform;
operate a movement mechanism to scan a drop ejecting head over the layer of powder;
while operating the movement mechanism, operate the drop ejecting head to define a an array of inked pixels having received varying amounts of different inks from the drop ejecting head and thereby have a varying absorption coefficient for a defined spectral distribution of light;
operate the movement mechanism to scan a light emitting device head over the layer of powder, the light emitting device head having a columnar arrangement of light emitting devices that emit light having the defined spectral distribution; and
while operating the movement mechanism, operate the light emitting devices so as to apply optical energy to the array inked pixels whereby an optical energy per unit area is varied to compensate for the varying absorption coefficient of the array inked pixels.

12. The method of claim 11, wherein operating the movement mechanism and the drop ejecting head includes forming an outer boundary of the three dimensional article having a varying color that correlates with the varying absorption coefficient.

13. The method of claim 12, wherein operating the drop ejecting head includes ejecting drops of different primary colors to provide the varying color, the different primary colors have correspondingly different absorption coefficients for the defined spectral distribution.

14. The method of claim 13, wherein defining an array of inked pixels includes defining inner pixels within the outer boundary, a selection of primary colors for the inner pixels is based upon a different criteria than a selection of primary colors for the outer boundary.

15. The method of claim 14, wherein the different criterial includes optimizing an absorption coefficient for the inner pixels.

16. The method of claim 11, wherein operating the light emitting devices includes operating an array of VCSEL (vertical surface-emitting laser) devices.

17. The method of claim 11, wherein the array inked pixels include boundary inked pixels containing portions of a defined outer boundary of the three dimensional article of manufacture.

18. The method of claim 17, wherein operating the light emitting devices includes solidifying portions of the boundary inked pixels to provide the portions of the outer boundary within the boundary inked pixels to enhance the resolution of the outer boundary.

19. The method of claim 18, wherein, prior to solidifying portions of array inked pixels, the controller operates the light emitting devices at a lower power level to dry the ink within array inked pixels.

* * * * *